May 4, 1954  C. M. TURNER  2,677,771
ION SOURCE
Filed March 5, 1953  4 Sheets-Sheet 2

INVENTOR.
Clarence M. Turner
BY
ATTORNEY

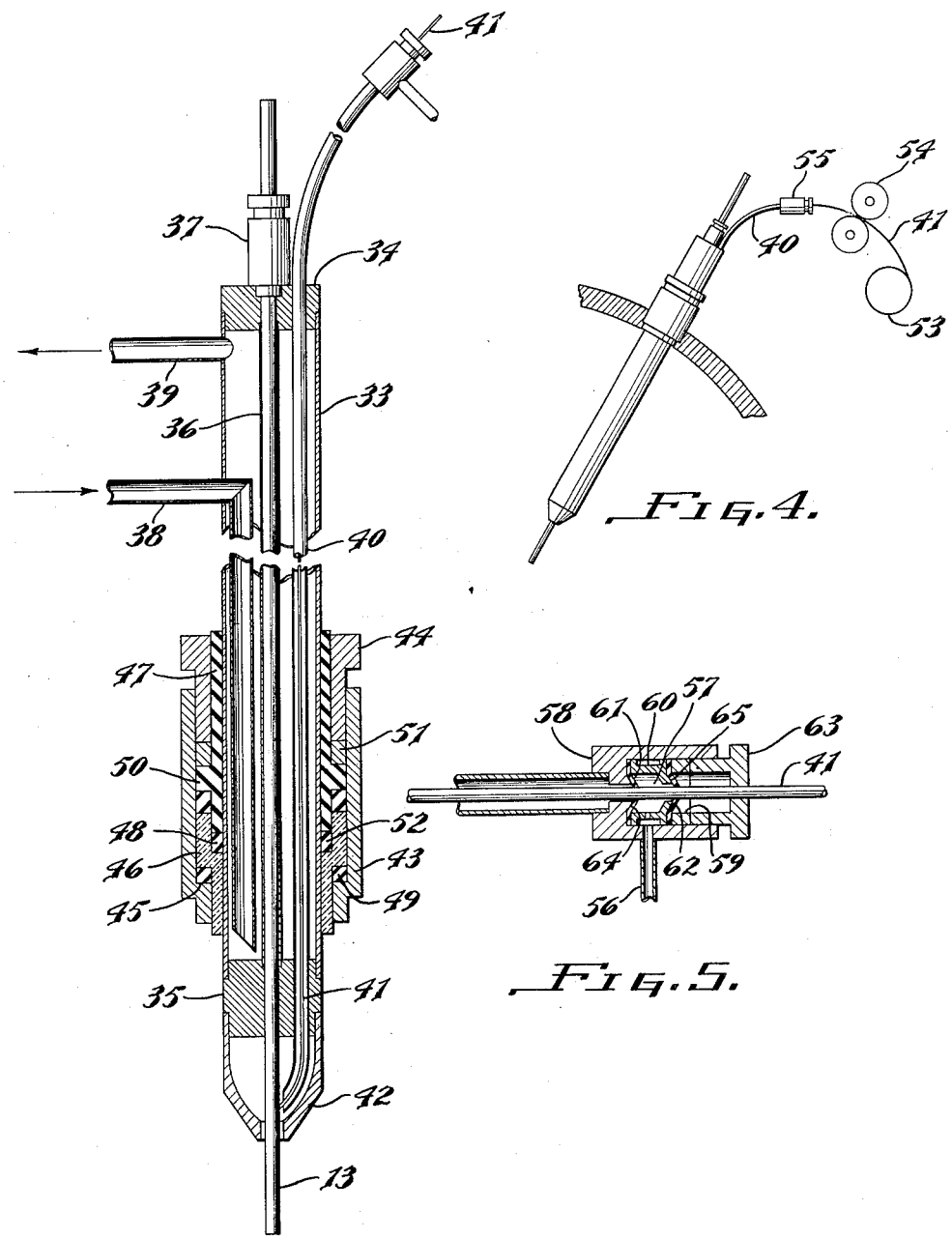

May 4, 1954 C. M. TURNER 2,677,771
ION SOURCE
Filed March 5, 1953 4 Sheets-Sheet 4

INVENTOR.
Clarence M. Turner
BY
ATTORNEY

Patented May 4, 1954

2,677,771

UNITED STATES PATENT OFFICE 2,677,771

ION SOURCE

Clarence M. Turner, Stony Brook, N. J., assignor to the United States of America as represented by the United States Atomic Energy Commission Application March 5, 1953, Serial No. 340,421

5 Claims. (Cl. 250—41.9)

This invention is a continuation-in-part of application S. N. 693,335, filed August 27, 1946, now abandoned and relates to methods and apparatus for generating gaseous ions of metals having a relatively high vaporizing temperature; and especially to means and procedures for generating a substantial quantity of said ions, such as are required in apparatus for separating or concentrating the isotopes of said metals by appropriate selective operations upon the ions of different atomic mass contained in an ion beam.

It is necessary to be able to separate isotopes of various metals in order to obtain a selected isotope of single activity for medical and research purposes, for example. For medicinal purposes, it is known that certain parts of the animal body have an affinity for certain substances, with the result that if a selected isotope of known half-life is introduced into the body it will become concentrated in certain areas of the body. Therefore if an unwanted growth is present in a certain portion of the body, the selection of the isotope which will be accumulated in that portion of the body is selected. Since these substances are not naturally radioactive, they must be irradiated with the consequent production of several isotopes. Because a monoisotopic substance must be used, it is seen that a method and apparatus for separating the isotopes in practical quantities is important to the progress of this medical speciality. Further, certain isotopes of cobalt are important sources of radiation in the art of radiography.

Accordingly, it is necessary to provide an apparatus and a method for the separation of isotopes each from the others of metals such as, for example, the separation of copper isotopes 63 and 65, cobalt isotopes 59 and 60, or the uranium isotopes 234, 235, 237 and 238. The apparatus of this application is capable of the separation of isotopes of closely equal mass of whatever kind and therefore is applicable to the separation of isotopes of other metals than those mentioned above.

In the quantity production of ions under vacuum conditions, sources of the arc discharge type are particularly advantageous, especially where a non-gaseous material such as a metal is to be ionized since it has been found that the metal may be supplied or fed directly to the ionizing device i. e., into the arc region in wire, granular or like form. In a specific aspect, the present invention deals mainly with the type of ion source wherein the metal is fed directly into the arc region and preferably onto the electrodes of the arc discharge so that it may be there vaporized and subsequently ionized to produce the desired ion output.

The ionization of a material, especially a metal that is difficult to vaporize in quantities larger than laboratory requirements, presents many difficulties. One of the foremost difficulties encountered in our research leading to the development of this and other satisfactory ion sources was the rapid deterioration of parts which prevented continuous operation for long periods. The necessity for developing apparatus capable of operating continuously for long periods will be evident when it is considered that the generation of ions and their classification must be carried out under vacuum. Accordingly, it is desirable to avoid the necessity for frequent replacement of parts which would require the breaking of this vacuum and result in loss of time necessary to outgas and to again pump down to the desired vacuum. The importance of the time element in the procedure for separating isotopes of source metals and the necessity for a continuous operation is made apparent when it is considered that the small abundance ratio of a desired isotope in a mixture of isotopes requires that unusually large quantities of the source metal be vaporized and ionized in order to obtain even modest amounts of the desired isotope.

It was found that the major difficulties as regards deterioration of parts resulted from the readiness with which an element such as cobalt, copper or uranium reacts or alloys with other substances, especially at the high temperature that must be reached in order to melt and vaporize these metals. It was found that in those instances wherein the source metal was fed directly onto the anode, excessive contamination and concomitant deterioration could be avoided by limiting the concentration of said material relative to the amount of anode material, e. g. tungsten, present at any one time.

In order to reduce cathode deterioration various practices and/or procedures were resorted to, including indirectly heating the cathode, shielding, etc. These procedures were effective in prolonging the life of the cathode and thus extending the uninterrupted operating time of the ion source. It was observed, however, that even this extended uninterrupted operating time was still determined by the lifetime of the filament serving as the arc cathode or of the filament serving to heat indirectly the cathode of the arc discharge.

I concluded accordingly that the use of filaments for continuous operation as the arc cathode or the heaters for the arc cathodes are particularly undesirable because they are prone to erode upon becoming contaminated with material being vaporized and ionized; and I set out to develop an operable ion source that would dispense with the use of filaments as the cathode or as a continuous source of heat for the arc cathodes.

The principal object of the invention is to meet the problems of the sort outlined above by providing an ion source that does not require the use of a continuously energized filament.

It is the further object of this invention to provide a simple rugged ion source for an isotope separating apparatus requiring a minimum of auxiliary equipment.

I have discovered that the use of a continuously energized filament may be eliminated by running an alternating current arc between two or more rod-like electrodes formed of tungsten, for example, each heated initially to an electron emissive temperature and each being covered with molten source metal to be vaporized and ionized. In order to reduce fluctuations occurring in the ion output at least a three-phase arc is preferred.

Specifically, the ion source of the present invention comprises three comparatively heavy tungsten rods serving as arc electrodes. Heavy or massive rods have been selected, since it has been observed that for maximum efficiency the anode (the electrode of the arc discharge at which most of the energy is dissipated) must be kept at a proper temperature to prevent an excessive rate of evaporation of the metal to be ionized. Neglecting conductive cooling of the anode, the power it can dissipate is directly proportional to the square area free to radiate. Therefore, if an ion source produces a given number of ions under optimum operating conditions and it is desired to increase the ion output by a factor of two (2), for example, it is necessary then to provide twice the anode area rather than simply double the current in the arc.

I have found it preferable to arrange the heavy rod-like electrodes symmetrically about an axis as if in a cone with the tips of the rods spaced slightly from each other and with the rods each inclined to the said vertical axis at an angle of 30°. Each electrode assembly is provided with an individual wire feed for supplying the metal to be vaporized to the surface of the rod near the tip so that the metal melts and runs down and around the rod to present itself for vaporization in the arc. A three-phase alternating current voltage is connected to the rods, one phase between each pair of rods through suitable stabilizing resistors and a "variac" control. An auxiliary starting filament may be placed near the rods to heat them simultaneously by electron bombardment. This auxiliary starting filament is adapted to be moved in a sliding seal from its position for starting, which is closely adjacent the arc electrodes; to an operating position wherein the filament is displaced from the arc and thus not subjected to contamination by ion bombardment.

A significant and basically important feature resulting from the above arrangement wherein each rod electrode serves alternately as an anode and a cathode thereby providing a sort of a rotating arc, is that the vapors of the metal to be ionized are evolved at each of the rod-like electrodes so that the vapors being evolved from the electrode serving at a particular instant as the cathodes are bombarded by electrons being emitted from this arc electrode. These electrons have the desired low energy; and by being emitted in a high vapor pressure region increase the production ratio of singly to doubly charged ions. Further advantages result from the fact that when source metal ions are being generated with this apparatus utilizing tungsten electrodes, the coating of source metal on the tungsten serves as an excellent electron emitter. Moreover, the structure is very simple, rugged and involves a great economy of equipment since the three-phase power can be used without any auxiliary apparatus other than simple control device mentioned above.

Other objects and advantages of novel features and structural combinations will be made more apparent from the following descriptions and accompanying drawings of a preferred embodiment of this invention.

In the drawings:

Figure 3 is an enlarged elevational view in cross-section showing the details of the arc electrode assembly;

Figure 4 is a schematic illustration of the electrode and wire feeding apparatus;

Figure 5 is a detailed view in section of the seal for the wire feeding apparatus and Figure 6 is a wiring diagram for the ion source of the present invention.

Figure 1:
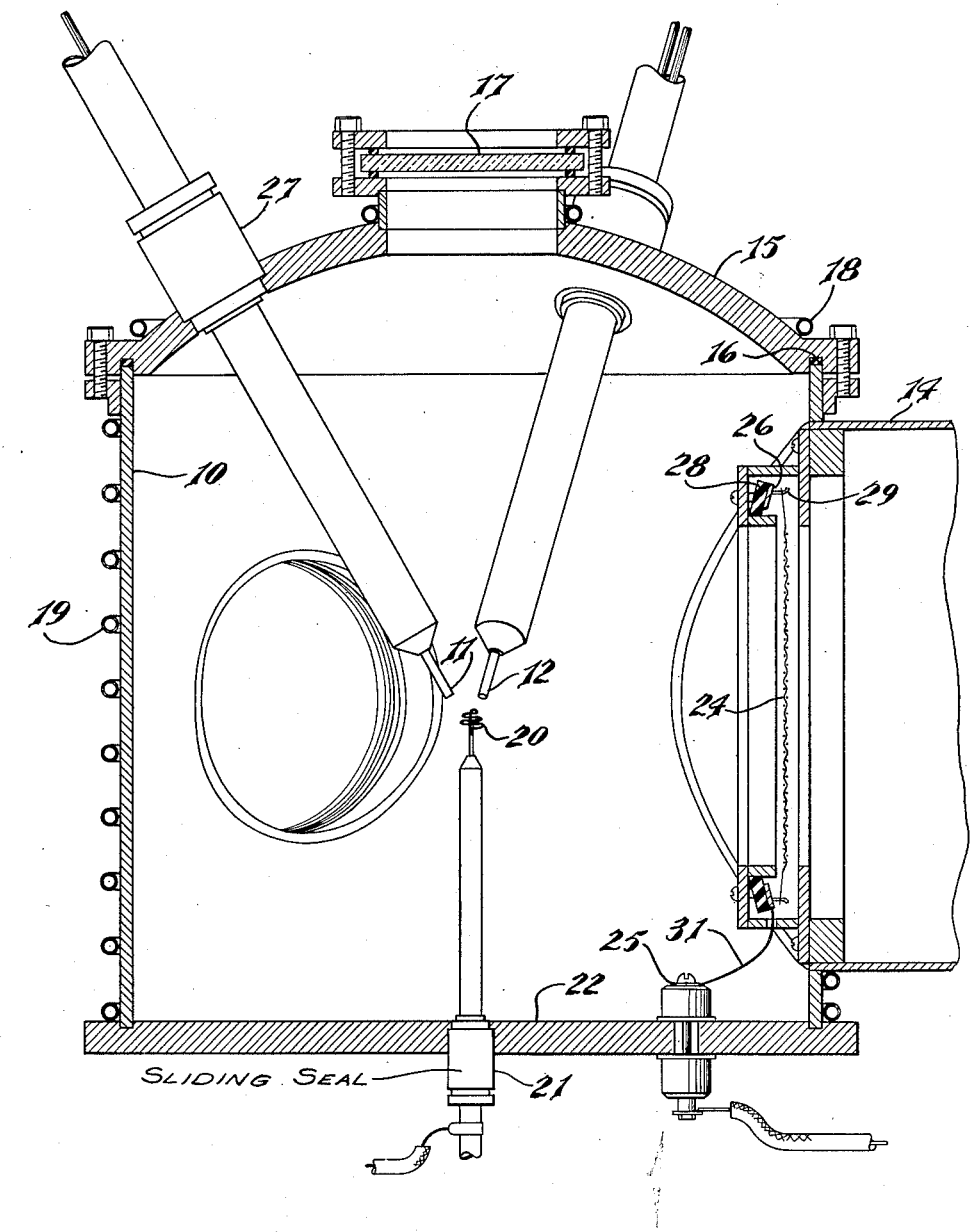
Figure 1 is a cross-section elevational view of the ion source of the present invention, the section being taken on the lines 1—1 of Figure 2.
Figure 2:
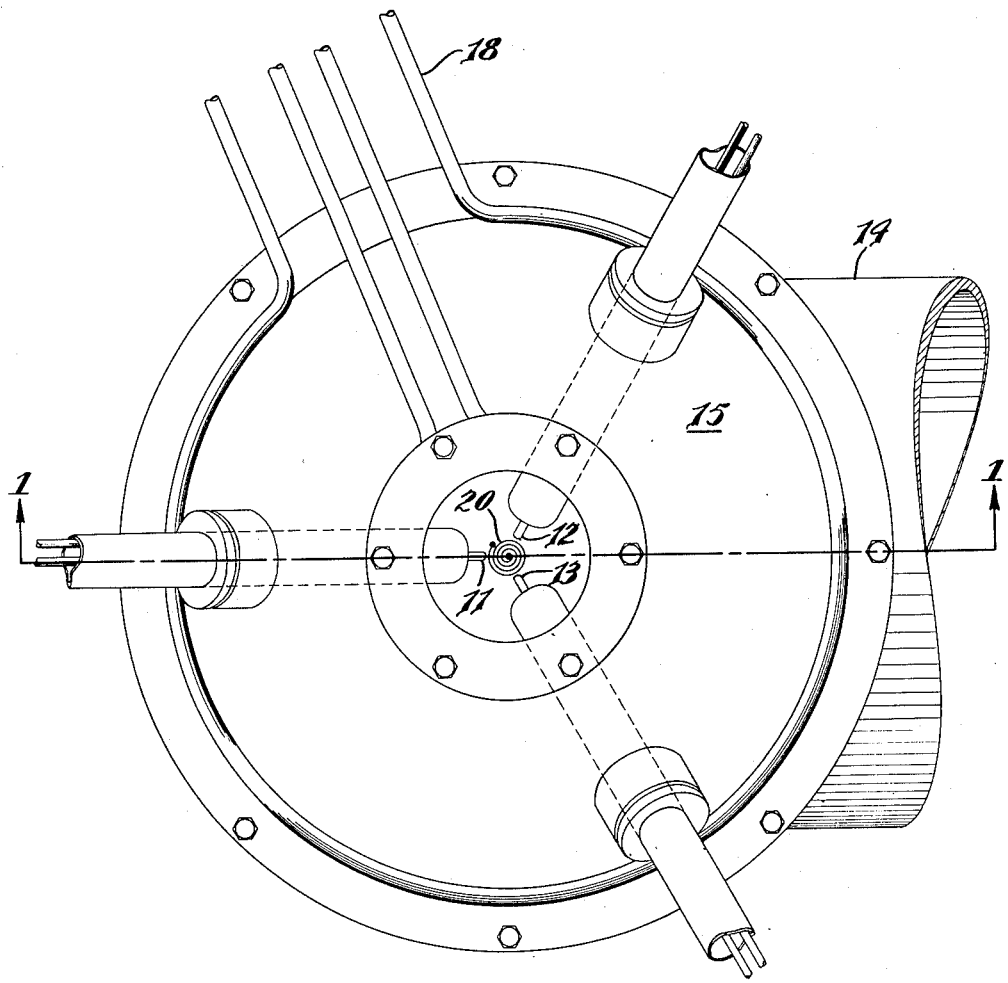
Figure 2 is a plan view of the ion source shown in Figure 1.

Referring now to the drawings, and more particularly to Figures 1 and 2 there is shown one way of utilizing an ion source unit embodying the present invention in an ion utilization apparatus such as the "Isotron" tube to provide a copious supply of gaseous ions of a metal isotope source and to provide also an enclosure for the ion source. As illustrated, the ion source unit includes a box-like closure 10 for supporting the arc electrodes 11, 12 and 13 in a central position relative to the "Isotron" tube indicated diagrammatically by the cylindrical housing 14, so that the place of origin of the gaseous ions generated in the three-phase arc will be substantially centered relative to the longitudinal axis of the "Isotron" tube. More specifically, the arc electrodes are shown supported in a dome-shaped cover plate 15 of brass or other suitable material having high thermal conductivity by means of insulated and sealed bushings indicated generally at 27; and more fully described later in connection with Figure 3. This cover plate is sealed to the box-like housing by a gasket 16 and is shown provided with a suitable window 17 through which the operation of the arc may be viewed. Cooling tubes 18 are attached to this cover plate in thermal conductive relation therewith and cooling tubes 19 are also shown attached in a like manner to the box-like housing 10.

Figure 6:
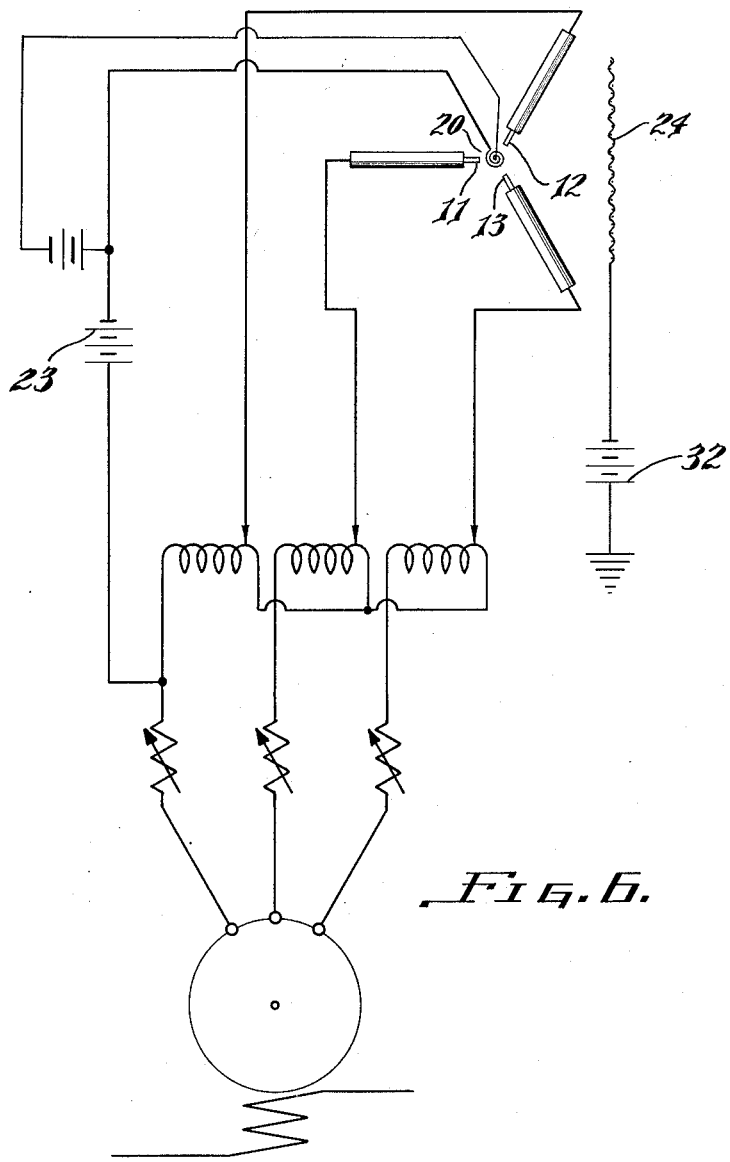

An auxiliary starting filament 20, of tungsten for example, is supported in a sliding seal 21 in the base plate 22 of the housing so that the filament may be moved into a position for joint electron bombardment of each of the electrodes, the electrons emitted from the auxiliary starting filament being accelerated by the source of direct current potential 23 (Figure 6) connected in series with the filament and arc electrodes. This bombardment by accelerated electrons heats each of the electrodes to a suitable electron emissive temperature; and melts and evaporates the metal wire applied to the electrodes. Thereafter, the auxiliary starting filament is withdrawn from its starting position adjacent the electrodes, and the arc is maintained by the three-phase alternating current supply.

The ions generated in this arc are withdrawn from the vicinity of the three arc electrodes and accelerated into the isotron tube 14 by means of an electric field established between the arc electrodes and a wire screen accelerating electrode 24 shown supported to cover the entrance to the isotron tube. The structure for supporting the screen and insulating it from the housing 14, consists of a metal ring portion 26, attached to the housing through the ring 28 of insulating material. Since the screen 24 becomes hot and expands when bombarded by ions being accelerated therethrough, it is held under tension by a plurality of spring-like fingers 29 which project from the ring 26. The flanged portion 30 of the housing 14 protects these leaf springs and supporting plate from bombardment by ions. A lead-in-conductor 31 for connecting the screen electrode to a source of accelerating potential 32 (Figure 6) is secured to a bushing 25 which is sealed and insulated in the base plate 22.

Referring now to Figure 3 of the drawings there is shown the assembled arc electrode and wire feeding apparatus, indicated generally at 27. This electrode assembly 27 comprises essentially a cylindrical tube 33, of steel for example, into which is soldered the circular plate-like end caps 34 and 35. These end caps are each provided with aligned centrally drilled openings each having an enlarged diameter portion extending from their inner surfaces for supporting the cylindrical tube 36 adapted to house and contain the arc electrode 13, for example. This arc electrode passes through a sliding seal 37 which is shown supported and sealed in the plate 34, so that as its tip point erodes, the electrode may be advanced to provide a new surface for supporting the source metal and for constituting ultimately the anode and cathode of the rotating arc. The tube 33 of the electrode assembly is shown provided with entrant and exit tubes 38 and 39 respectively for supplying a coolant to the guide tube 40 for the wire feed and to the arc electrode housing 36. As illustrated, the entrant tube 38 is provided with a right angle bend and extends inwardly of the bushing to a point short of the end cap 35. The guide tube 40 is also shown supported within the interior of the housing 33 for directing the feed of the wire 41, made of the material to be vaporized and ionized, longitudinally through the electrode assembly to a point of contact with the arc electrode near its tip. A shield 42 for the wire is secured to the end cap 35 and is tapered about the arc electrode.

Although any number of insulating seals known to the prior art may be used for sealing the arc electrode and wire feeding assembly 27 into the cover plate 15 of the ion source housing, one remarkedly successful seal is illustrated in cross-section of Figure 3. This seal consists essentially of a metallic insert 43 in the form of a cylindrical bushing which is soldered or otherwise securely retained in a drilled opening of the cover plate 15. The end of the insert 43 extending to the high pressure side of the cover plate 15 is internally threaded to receive a packing gland 44 whereas the inner end of the bushing that is substantially flush with the inside surface of the cover plate is provided with a projecting flange or shoulder 45. Interposed between the housing 33 for the electrode assembly and the metallic insert 43 are two insulating bushings 46 and 47, at least the former of which is formed of a refractory material. Bushing 46 of refractory material is fashioned with a section of enlarged diameter into which a uniform diameter portion of the insulated bushing 47 may be inserted. The sealing ring 48 is interposed between the end surface of the bushing 47 and the inner shoulder of the bushing 46. So also is a sealing ring 49 placed at the rear of the bushing 46 between a shoulder formed by the enlarged portion thereon and the shoulder 45 of the metallic insert 43. The bushing 47 has a flange or an enlarged cylindrical portion 50 which is adapted to be engaged by the end surface of the packing gland 44 through the ring 51 to compress the sealing ring 52 through the opposing faces of the shoulder of the flange 50 and the end surface bushing 46.

In Figure 4 there is illustrated diagrammatically the arrangement for feeding the wire to the electrode assembly shown supported in the cover plate. As illustrated, the guide tube 40 for the wire terminates in a Wilson type sliding seal 55 shown more fully and in cross-section in Figure 5. The wire 41 is fed from a drum 53 by means of the driving mechanism 54 through the Wilson seal 55 and through the guide tube 40 to its point of contact with the electrode 13. The problem for the vacumm seal for the wire may be solved either by pushing the wire through the seal or by storing the wire on a drum contained within an evacuated container. I have preferred to utilize a double sliding seal of the type developed by Robert R. Wilson and described in vol. 12, pages 91 to 93 of Review of Scientific Instruments. In this type of seal a connection 56 is provided between the two seals for evacuating the space 57. The seal proper consists of a bushing 58 to which the guide tube 36 is secured which bushing is provided with a conical end surface 64 and is adapted to contain the cylindrical spacer ring 59 and the spacing element 60 which also has a conical end surface 65. The two rubber-like washers 61 and 62 engage the wire 41 and are deformed out of their normal plane in the direction toward the high pressure side of the seal. This deformation in the rubber-like washers 61 and 62 is maintained by means of the conical surfaces 64 and 65 provided respectively in the end surface of the bushing 58 and the spacing element 60. The packing gland 63 is adapted to be threaded into the bushing 58 to compress the rubber-like washers between the ring 59, the spacing element 60 and the bushing 58.

The principle of the seal illustrated is that the wire 41 slides through the thin pieces of the sheet rubber 61 and 62 in which a hole has been punched of a diameter considerably smaller than the diameter of the wire. Thus the rubber close to the wire is distorted and bent out from its normal and plane surface. This bend in the rubber-like washers is maintained toward the high pressure side of the seal by the conical shape of the spacer element and the end wall of the bushing. The gas pressure from the right hand side of the seal as viewed in Figure 5, as well as the elasticity of the rubber, forces the inner edge of each rubber washer against the sliding wire so that no air leaks past the seal as the wire moves through the seal. The outer edge of each of the rubber washers is pressed tightly down by the packing gland nut to effectively seal the gland at these points.

An ion source embodying the features of the present invention was constructed and operated wherein the arc electrodes were formed of tungsten rods of 150 mil. diameter, each rod being fed with $\frac{1}{32}''$ source metal wire. It was found in operating such a source that the wire guide tube may be at anode potential if it is effectively shielded to prevent the arc from running to the feeder and melting the wire at a point other than the point of contact with the electrode. The rate of feed is adjusted to provide a constant feed of small amounts of source metal to produce nearly constant arc conditions.

I do not propose to be limited by the above description to the use of the above precise arrangement, and it is understood the above description of the preferred embodiment of this invention is set forth only so that others may likewise readily obtain the good results and objects of this invention with the understanding, however, that changes in the construction and combination of parts may be made without departing from the spirit and scope of this invention as expressed in the appended set of claims.

I claim:

1. An ion source having arc structure including a cathode and an anode, each comprising a vaporizable material the ions of which are desired, means establishing an arc discharge between said cathode and said anode for vaporizing and ionizing said material, and means for withdrawing from the region of said arc at least a portion of said ions.

2. The combination defined in claim 1 above wherein said material comprises copper.

3. The combination defined in claim 1 above wherein the said material comprises cobalt.

4. An ion source having arc structure comprising at least a pair of arc electrodes, means for supplying to each electrode a vaporizable material of the ions which are desired, and means for establishing an alternating current arc between said electrodes whereby low energy electrons emitted from the electrode serving at any time as the cathode of the arc, immediately encounter a region of high vapor pressure to increase the production ratio of singly to doubly charged ions.

5. An ion source having arc structure comprising at least a pair of arc electrodes, means for supplying to each electrode a vaporizable material of the ions which are desired, means connecting said electrodes to a source of alternating current, and filament means movable into position for simultaneously bombarding said electrodes with accelerated electrons to heat said electrodes to vaporize said material for starting said arc.

No references cited.